Oct. 18, 1955

G. W. LIBERTY 2,720,668

TRIMMING MACHINE

Filed June 29, 1953

INVENTOR
GEORGE W. LIBERTY
BY
Dike, Thompson and Sanborn ATT'YS.

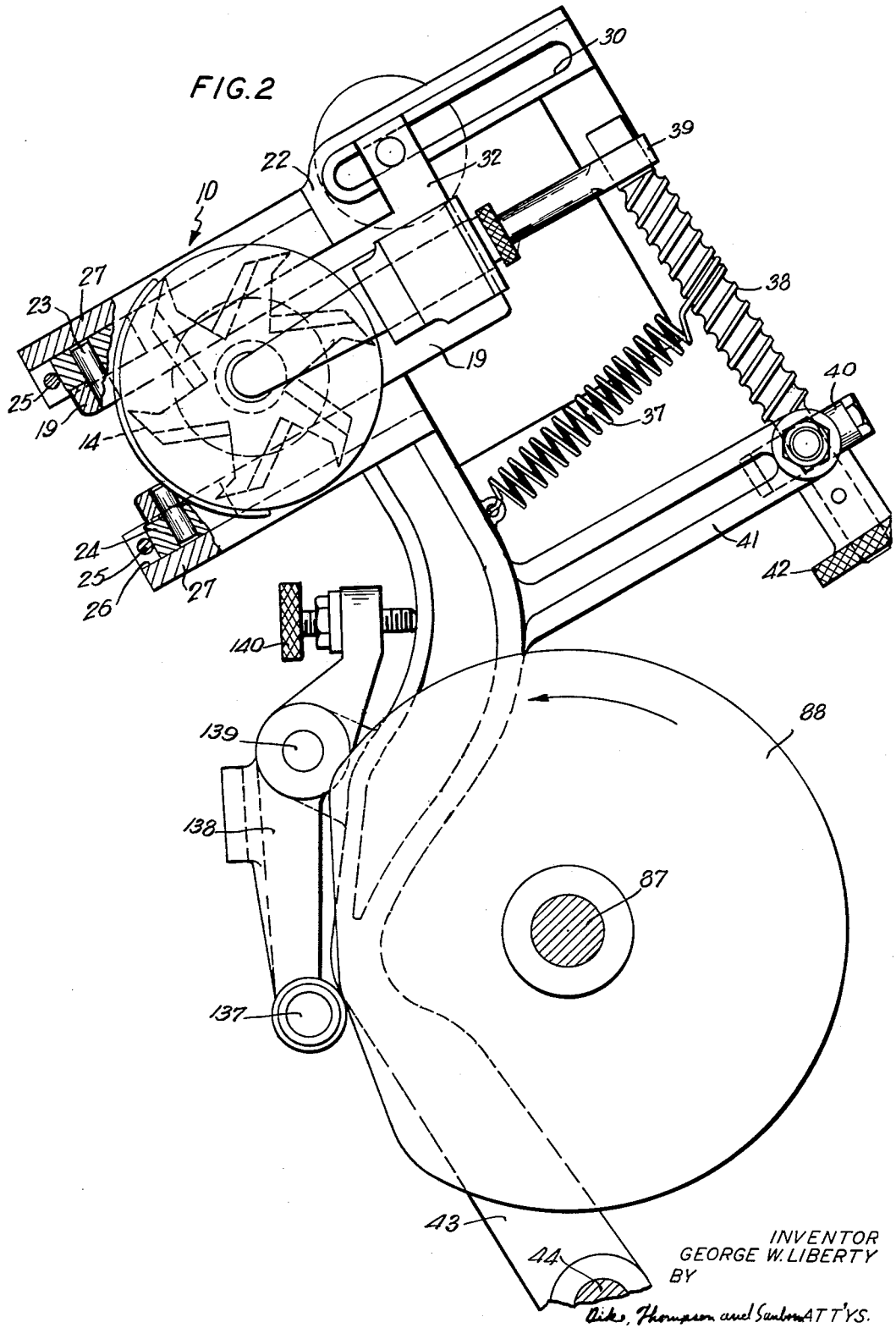

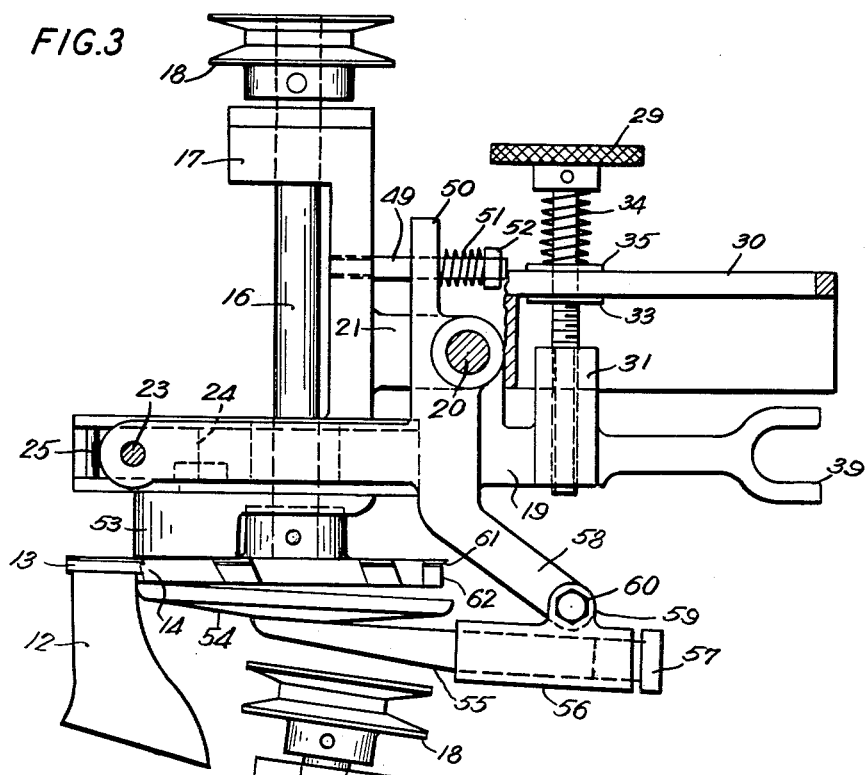
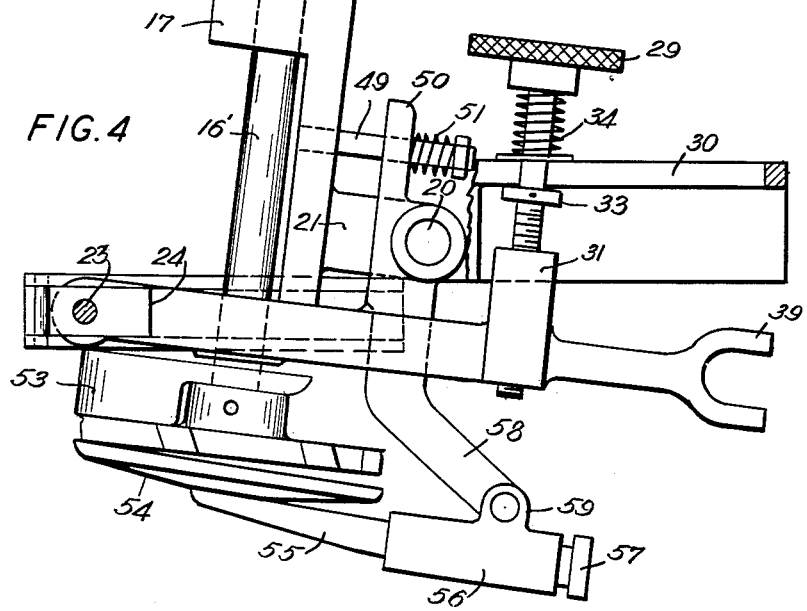

Oct. 18, 1955  G. W. LIBERTY  2,720,668
TRIMMING MACHINE
Filed June 29, 1953  5 Sheets-Sheet 4

INVENTOR
GEORGE W. LIBERTY
BY
Oike, Thompson and Sanborn ATTYS.

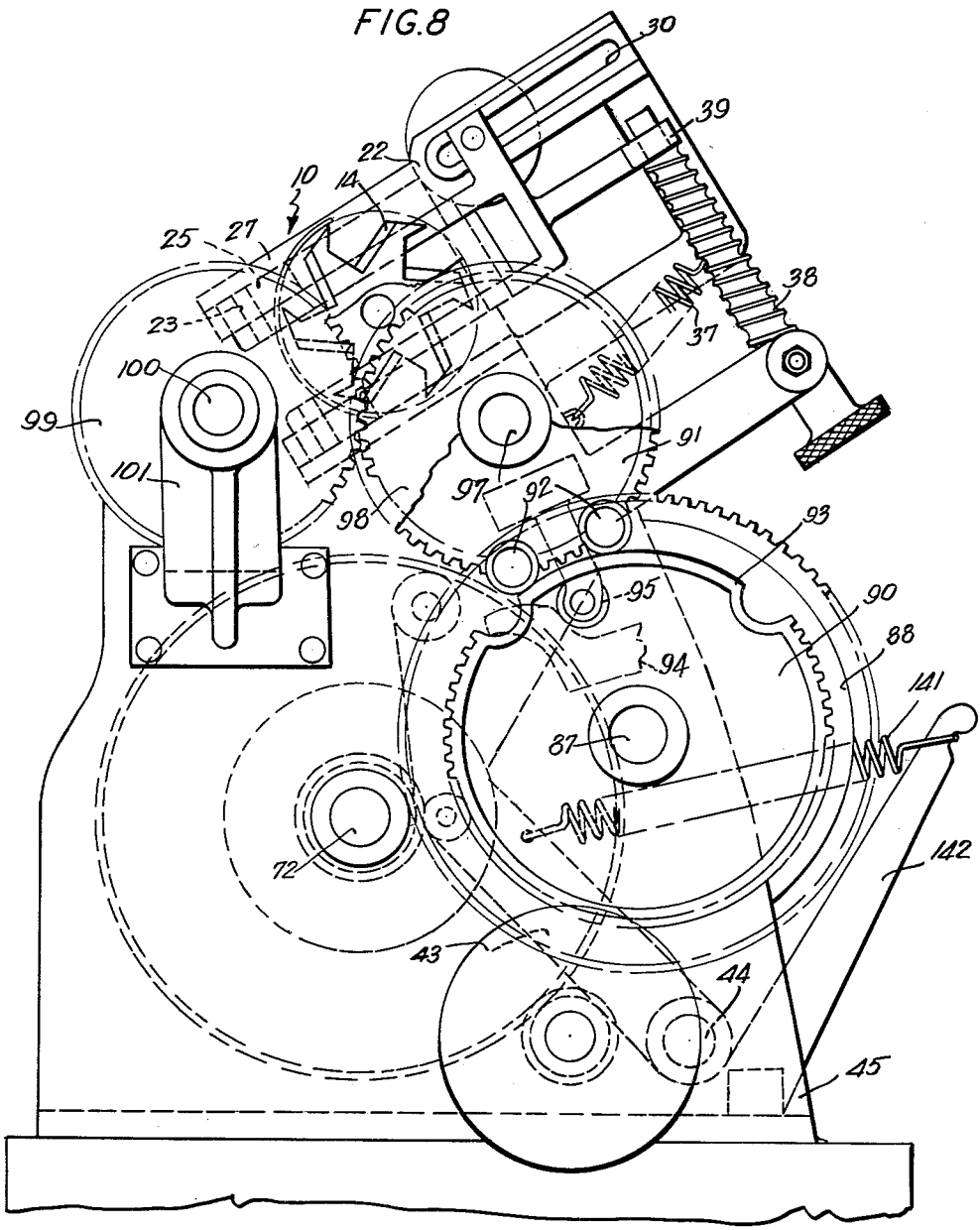

United States Patent Office 2,720,668
Patented Oct. 18, 1955

2,720,668

TRIMMING MACHINE

George W. Liberty, South Lynnfield, Mass., assignor to National Development Company, Lynn, Mass., a corporation of Massachusetts Application June 29, 1953, Serial No. 364,809

9 Claims. (Cl. 12—87)

The present invention relates to trimming machines and particularly to a machine for trimming surplus stock from the top lifts on the heels of shoes, such as ladies' high heel shoes.

In making a heel for a lady's high heel shoe, a wooden heel is covered with a skin of leather or plastic and a roughly shaped top lift is tacked on the bottom. Top lifts are either leather, rubber or composition. Then the top lift is trimmed and edge finished so that it blends with the contour of the heel. Also a small bead is formed around the bottom edge of the top lift to give a balanced appearance to the shape of the heel.

At present, top lifts are trimmed by hand. That is, a worker holds and rotates the heel on a guard plate and presses the edge of the top lift against the cutting edge of a rotating cutter.

When the top lifts to be trimmed are rubber or composition, the bead around the bottom edge of the top lift must be formed when the top lift is trimmed because the rubber or composition cannot be pressed and molded by a subsequent pressing or ironing operation as can leather. Therefore the edge of the top lift must be presented to the cutter in the same plane as the cutter so that depressions in the cutting edges at one side of the cutter will leave a bead around the top lift and so that the "bed," which is the portion of the top lift between the bead and the heel proper, will be flat. This method of trimming produces the most satisfactory results, because the bead and the bed are more perfectly and durably formed than if molded. However, this method requires a great deal of physical exertion to hold the edge of the top lift directly against the centrifugal force of the cutter and it is used only in trimming rubber or composition top lifts.

In trimming leather top lifts, the guide plate is arranged so that the top lift is presented to the cutter with the edge of the top lift perpendicular to the edge of the cutter. In practice most top lifts are leather and this is the method used almost exclusively in the industry to trim them because it requires less physical exertion to hold the top lift against the cutter and permits greater production. However, it is impossible to form a bead by this method and the bed is made concave by the curvature of the cutting disk. Therefore, to finish the heel properly, the bed is flattened and the bead is formed in the edge finishing operation.

In the edge finishing operation, the top lift is inked or waxed and then ironed. The ironing smooths the inked or waxed surface and compresses the leather of the top lift flush with the heel and moulds a bead of compressed leather and finishing wax around the bottom edge of the top lift.

These methods of trimming top lifts, are slow compared with other operations in the manufacture of shoes, and since the quality of the work produced is dependent upon the skill and accuracy of the worker, it is not uniform.

The present invention provides a machine which automatically trims the top lift of a heel placed on the work support of the machine by the operator. It trims the edge of the top lift to conform to the shape of the heel and the trimming forms a flat bed and a bead around the bottom edge.

The cutter of the machine of the present invention maintains itself in correct alignment with the top lift on a heel on the work support so that the operator need not take special care to position the heels on the work support with extreme accuracy. Thus, even an unskilled operator can turn out more uniform, accurate work, and as fast or faster than highly skilled workers using present types of trimming methods. Furthermore, the machine of this invention will trim leather, rubber or composition top lifts, and the leather top lifts will keep a neat appearance longer since the flat bed and the bead are trimmed into the top lift rather than pressed in, as at present.

Further objects and advantages of the machine of the present invention will be apparent from the following description and accompanying drawings in which:

Fig. 2 is a section along the line 2—2 of Fig. 1 and in addition includes the remainder of the cutter head, so as to show the whole cutter head in side elevation.

Fig. 3 is a view partly in section and partly broken looking squarely down on the cutter head.

Fig. 4 is a view similar to Fig. 3, but showing the cutter head in a different position of adjustment.

Fig. 8 is a right hand end elevation of the machine.

Figure 1:
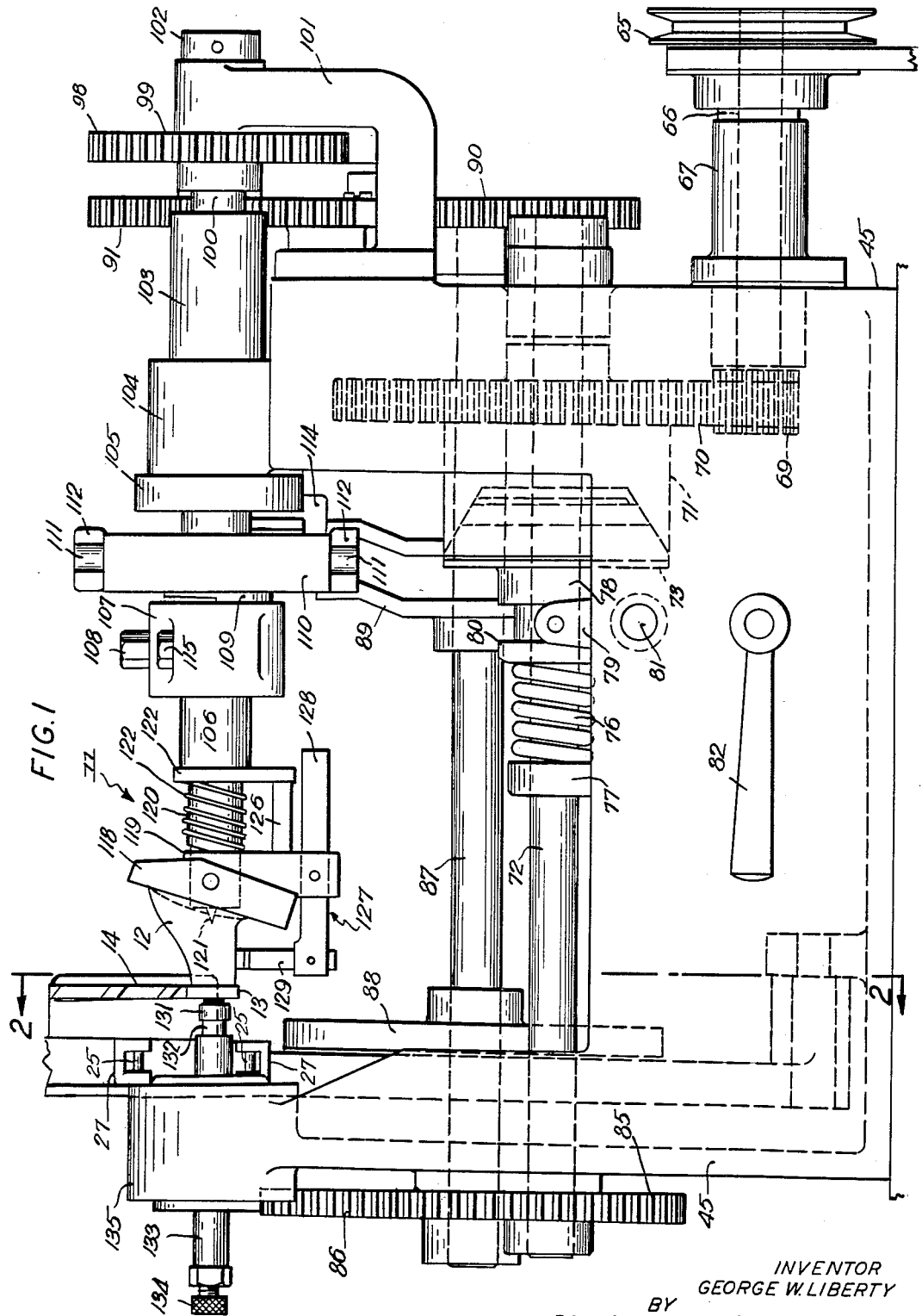
Fig. 1 is a front elevation of the machine of the present invention showing the drive mechanism, the work support or heel jack, and the lower portion of the cutter head with its cutting disk in contact with the top lift on a heel on the work support.

Referring now to Figs. 1 and 2 of the drawings, the machine of the present invention comprises generally a cutting head 10 carrying a rotating cutter 14, a heel jack 11 to support and rotate a shoe heel 12, and a drive mechanism operating to clamp a heel in the jack, swing the cutting head to present the cutter 14 to the edge of a top lift 13 on the heel, rotate the heel one revolution, swing the cutting head and cutter away from the heel and unclamp the heel. The cutter 14 is resiliently and flexibly suspended in the cutting head 10 and arranged to maintain itself in proper alignment with the edge of the top lift 13 so as to trim the top lift accurately all the way around the heel.

Figure 6:
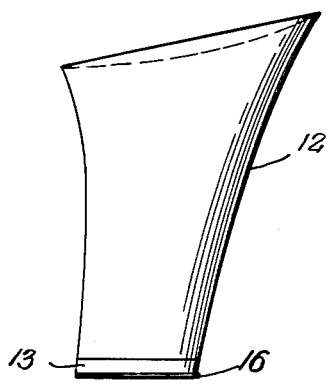
Fig. 6 is a side elevation of a lady's high heel with a trimmed top lift.

As shown in Fig. 6, the edge of the top lift 13 is trimmed to blend with the configuration of the heel 12 and a bead 16 is left around the bottom of the top lift to give the heel a balanced appearance.

Describing first the cutting head 10 and referring to Figs. 2, 3 and 4, the cutter 14 is a disk with cutting edges 62 crossing the disk around its periphery and with a depression 61 at one end of each cutting edge which form the bead 16 when the top lift 13 is trimmed. The center is pinned on one end of a shaft 16' journalled in a cutter support 17. A pulley 18 on the other end of the shaft is drivingly connected to a motor (not shown) to rotate the cutting disk continuously and at high speed. The cutter support 17 is pivotally suspended transversely through a slide 19 by a pin 20 through a boss 21 on the cutter support and the slide 19 is slidable in a carriage 22. At its lower end the slide 19 is pivotally connected by pivot pins 23 at opposite side edges to slide blocks 24 which slide in slideways 26 in the opposing inner faces of parallel ears 27 of the carriage 22. Stop pins 25 across the ends of the slideways 26 stop the slide blocks 24 from sliding out the ends of the slideways.

The cutting head 10 is swingable toward and away from the heel jack 11 by an arm 43 on the carriage 22 pivoted at 44 to the frame 45 of the machine (Fig. 8). It is caused to swing in timed relation with the intermittent rotation of the heel jack by means associated with the drive mechanism which will subsequently be described in detail.

The slide 19 is supported to slide in the carriage 22 in adjustable angular relation thereto by an adjusting screw 29 through a longitudinal slot 30 in the carriage and threaded into a boss 31 on an ear 32 which extends to the side of the upper portion of the slide 19. A washer 33 pinned on the adjusting screw 29 is held against the edges at one side of the slot 30 by a coil spring 34 around the screw and between the head of the screw and a washer 35 at the other side of the slot. Thus, the upper end of the slide 22 is moved toward or away from the carriage by the adjusting screw 29 and varies the angular relation of the slide and carriage to adjust the angle at which the edge of the cutting disk trims the edge of a top lift as illustrated by Fig. 4. As the slide moves up and down in the carriage 22, the screw 29 moves up and down in the slot 30 and supports the slide in its adjusted position.

The slide 19 is urged down in the carriage 22 as far as permitted by the stop pin 25 by the adjustable tension of a coil spring 37 (Fig. 2). One end of the spring 37 is attached to the carriage 22 and the other end hooks over and engages a helical thread on the central portion of a shaft 38. At one end the shaft 38 rests in a fork 39 on an upward projection of the slide 19 and is held therein by the tension of the spring 37. The other end of the shaft is journalled through gimple rings 40 on a projection 41 on the carriage 22, so that the shaft 38 is free to move up and down and from side to side as necessary to maintain contact with the fork 39 without binding when the slide 19 moves up and down in various positions of angular adjustment.

To adjust the tension of the spring 37, the shaft 38 is turned by a knob 42. This carries the upper end of the spring 37 along the helical thread of the shaft and stretches or relaxes the spring as required.

Figure 5:
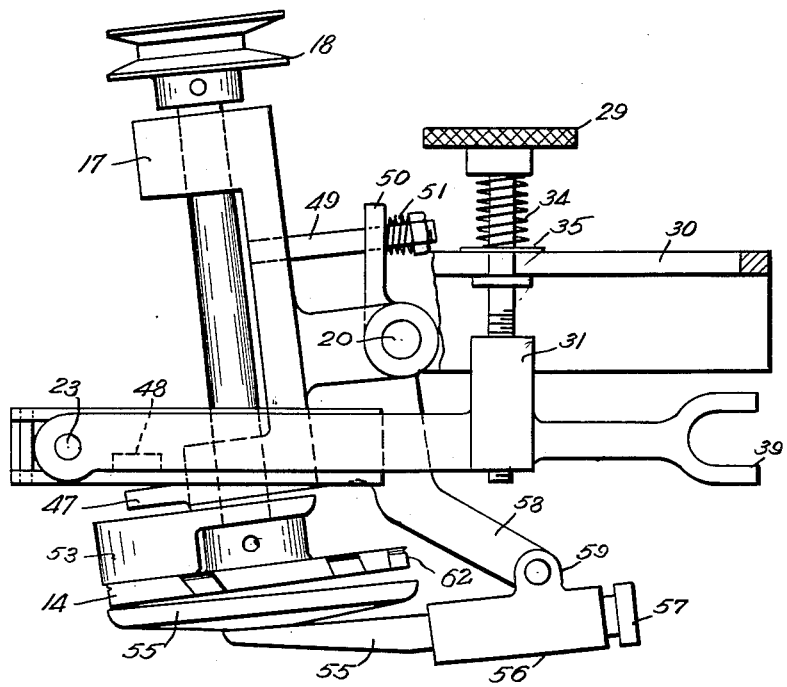
Fig. 5 is another view similar to Fig. 3 illustrating the flexible suspension of the cutting disk in the cutting head and indicating its range and direction of movement.

Referring now to Figs. 3, 4 and 5, the cutter support 17 which is pivotally suspended in the slide 19 is free to swing in a counterclockwise direction in which the cutter 14 swings upward and to the right, but is limited in its swing in the opposite direction clockwise by a stop 47 which is received in a cut out portion 48 in the lower part of the slide 19. It is urged in a clockwise direction against the slide 19 and kept under tension by a coil spring 51. A stud 49 in the cutter support extends through a hole in a projection 50 on the slide and the coil spring 51 is around the upper end of the stud between the projection 50 and an adjusting nut 52 on the end of the stud.

A guard 53 attached to the cutter support 17 to move with it is closely adjacent the side of the cutting disk 14 and extends beyond the lower edge of the cutting disk which contacts the top lift 13.

Figure 7:
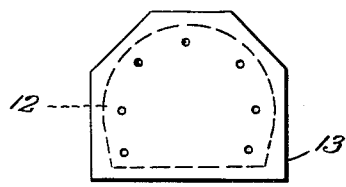
Fig. 7 is a bottom view of a heel showing an untrimmed top lift thereon.

In operation, the heel jack 11 and the cutting head 10 are arranged and adjusted so that when the cutting head swings toward the heel jack the edge of the cutter 14 contacts the edge of the top lift 13, and then the cutting head moves toward the heel jack a little more. The edge of the top lift 13 is offset slightly to the right relative to the edge of the cutter. As the cutter is pressed against the top lift by the movement of the cutting head, it is pushed upward and to the right until the portion of the guard 53 which extends beyond the edge of the cutting disk comes up against the bottom of the top lift 13. Then any continued pressure of the cutter 14 against the top lift 13 causes the slide 19 to be pushed up in the carriage 22 against the tension of the spring 37 (Fig. 2). The tension of the spring 37 is adjusted to resist upward movement of the slide 19 with slightly greater force than is required to swing the cutting disk 14 up and to the right (against the tension of the spring 51) so that the upward pressure on the cutter 14 causes it first to swing the guard 53 against the bottom of the top lift and then push the slide 19 upward. In this way the guard 53 holds the edge of the cutter 14 in correct cutting alignment with the edge of the top lift and the alignment is held while it is moved up and down by the irregular edges of an untrimmed top lift. For example, as shown in Fig. 7 the edges of an untrimmed top lift 13 usually extend out beyond the bottom of the heel considerably and at sharp angles but they are compensated for by the resilient up and down movement of the slide 19. Also, this arrangement correctly maintains the alignment even though the heel 12 is not positioned in the heel jack 10 with absolute accuracy.

To gauge the depth of the trimming of the cutter, so as to trim the edge of the top lift in conformity with the adjacent side of the heel a rolling gauge 54 attached to the cutter support 17 rolls on the side of the heel adjacent the top lift and limits the downward movement of the cutter. The rolling gauge 54 is a disk rotatably attached on the side of a shank 55 which is adjustably secured in a sleeve 56 by a screw 57, fixed in the top of the sleeve and threaded into the end of the shank. The sleeve 56 which is secured on the end of an arm 58 of the cutter support 17 is swingable about a pivot 59 on the end of the arm 58 to move the rolling gauge 54 toward and away from the side of the cutting disk 14, and is held in an adjusted position by a mesh nut 60 at the pivot. The rolling gauge 54 is normally positioned closely adjacent the cutting disk 14. In Fig. 3, it is shown adjusted for trimming leather top lifts. It is extended slightly beyond the cutting edge of the cutter so that the trimmed edge of the top lift will project slightly beyond the adjacent sides of the heel. Then after the edge of the top lift is ironed and compressed in the subsequent edge finishing operation the edge of the top lift will be flush with sides of the heel. The amount the trimmed edge of the top lift projects is adjusted to the amount the leather will be compressed by ironings. The bead 16 is left around the bottom edge of the top lift by the depressions 61 in the cutting edges 62 of the cutter 14 as the edge of the top lift is trimmed.

Looking now at Figs. 1 and 8 the power drive means which drives and operates the heel jack 11 and the cutter head 10 comprise a motor (not shown) connected to a pulley 65 which is pinned on one end of a shaft 66 supported in a bearing 67 on the frame of the machine. A pinion 69 on the other end of the shaft 66 meshes with a gear 70 on a clutch drum 71. The gear 70 and clutch 71 are freely rotatable on a shaft 72 journalled in bearings in the frame 45 of the machine, and are connected to drive the shaft 72 by an internal clutch drum 73 which is fixed on the shaft 72 but slidably along it, by cooperating keys and keyways on the shaft and in the internal clutch drum. A spring 76 around the shaft 72 between a bearing block 77 of the hub 78 of the internal clutch drum normally urges the conical face of the internal clutch drum into driving engagement with the conical inside surface of the outer clutch drum 71. To disengage the clutch mechanism the clutch drum 73 is moved back along the shaft 72 by a fork 79 engaged between the side walls of a groove 80 in the hub 78 and pivoted about a point 81 by appropriate connections to a lever 82.

On the other end of the clutch shaft 72 a gear 85 meshes with a gear 86 on the end of a shaft 87 journalled in the frame of the machine. On the shaft 87 are a cam 88 which swings the cutter head 10 toward and away from the heel jack 11 and a cam 89 which opens and closes the heel jack 11. The arrangement and operation of these cams 88 and 89 will subsequently be described in more detail.

On the other end of the shaft 87 is a driving gear 90 of a stop motion mechanism which is best shown in Fig. 8. This stop motion mechanism is the subject of my co-pending application Serial No. 345,119, filed March 27, 1953, now abandoned, to which reference may be made for a detailed explanation of its structure and operation. It may be generally classed as a Geneva type stop motion in which the driving gear 90 intermittently drives a driven gear 91. A pair of rolls 92 on the driven gear 91 contact a cam surface 93 of the driving gear 90 and hold the driven gear 91 in stopped position as the cam surface 93 is carried past the rolls 92. Then a starting lever 94 on the driving gear strikes a roll 95 on the driven gear causing the toothed portion of the driven gear 91 to mesh with the toothed portion of the driving gear 90 and drive the driven gear.

The driven gear 91 which is connected to rotate the heel jack 11 is pinned on a shaft 97 journalled in the frame of the machine. Another gear 98 on the shaft 97 meshes with a gear 99 on a shaft 100 which is journalled in a bracket 101 on the frame 45 of the machine. A collar 102 fixed on one end of the shaft 100 holds it through the bracket 101 and the other end of the shaft is fixed inside a sleeve 103. The sleeve 103 is journalled in a bearing 104 on the frame of the machine and has a flange 105 against a face of the bearing. A shaft 106 is slidably received in the bore of the sleeve 103 and is connected for rotation with the sleeve by cooperating longitudinal keys and keyways on the shaft 106 and in the bore of the sleeve.

The shaft 106 is moved longitudinally back and forth within the sleeve 103 by connections with cam 89 to open and close the heel jack 11. A split ring clamp 107 is tightened around the shaft 106 by a locking screw 108 and an extension 109 of the clamp is press fitted into the bore of the inner race of a ball bearing which is enclosed within a ball bearing retainer 110 around the shaft 106. Thus the clamp 107 and the retainer 110 are connected but are rotatable relative to each other.

Rolls 111 attached on opposite sides of the retainer 110 are respectively engaged by the notched ends of forks 112 on one end of an arm (not shown) which is pivoted on a bracket 114 on the frame 45 of the machine. The arm is pivoted to swing parallel with shaft 106 and a roll (not shown) on the other end of the arm is engaged between the parallel walls of the cam 89 on the shaft 87. Thus the cam swings the arm and the forks 112 engaging the rolls 111 of the retainer 110 move the shaft 106 back and forth as the shaft 87 rotates the cam.

The clamp 107 is positioned along the shaft 106 to adjust the amount of opening of the heel jack 11 by a screw 115 which has longitudinal ribs meshing with grooves transversely across the shaft 106. When the locking screw 108 is loosened the screw 115 is turned to walk the shaft 106 through the clamp to the desired position.

The portion of the heel jack 11 in which the heel 12 is clamped comprises a heel seat support 118 which is pivoted on a block 119 so as to be tilted to match the slant of the seat of a heel 12 clamped in the jack. The block 119 is slidably attached on the end of a plunger 120 by a key in block riding in a limited keyway in the plunger. The plunger 120 is slidably received in a bore in the shaft 106 against the tension of a coil spring which is in the bore of the shaft between the end of the plunger and an annular shoulder in the bore. A key on the plunger engaging a key slot in the bore of the shaft connects the plunger for rotation with the shaft 106.

The end of the plunger 120 is exposed through the face of the heel seat support 118 and prongs 121 in the end of the plunger are pressed into the seat of a heel 12 when the heel is clamped in the heel jack. A coil spring 122 around the plunger between the block 119 and a collar 123 on the end of the shaft 106 urges the block 119 and heel seat support out to the end of the plunger to a position in which they shield the prongs 121. Thus the prongs 121 are shielded when the heel jack 11 is open and the seat of a heel 12 will slide over the face of the heel seat support 118 when the heel is positioned in the jack. As the shaft 106 is slid to close the jack and clamp the heel, the heel seat support and the block are pushed back on the plunger 120 against the spring 122 and expose the prongs 121 which press into the seat of the heel and hold it firmly in the jack. Then as the jack opens again the spring 122 pushes the heel seat support and block out on the plunger which withdraws the prongs from the seat of the heel so that the heel is easily lifted out of the jack.

The block 119 is steadied and prevented from independent rotation around the plunger 120 by a guide rod 126 attached to the collar 123 and slidably carried through a suitable hole in the block parallel to the plunger.

An L-shaped adjustable breast gauge 127 to position a heel 12 in the heel jack has a member 128 forming the long leg of the L and adjustably secured through a lower part of the block 119 parallel to the plunger 120. A member 129 forming the short leg of the L is adjustably secured perpendicularly through the member 128 to contact and support the heel 12. When the heel jack 11 is in clamped position, the bottom of the heel 12 in the jack is pressed against a heel stop 131 which is on the end of a shaft 132. The shaft 132 is supported through a sleeve 133 and adjustably positioned by an adjusting screw 134 threaded into the sleeve 133 and bearing against the end of the shaft. The sleeve 133 is supported for rotation in a bearing 135 in the frame 45 of the machine so that the heel stop 131 rotates with the heel in the jack.

Referring now to Fig. 2 the means for swinging the cutting head 10 successively toward and away from the heel jack 11 comprises a cam follower 137 associated with the arm 43 of the carriage 22 of the cutting head and in contact with the cam surface of the cam 88 which is on the shaft 87. To adjust the cutting head 10 to swing toward the heel jack to a predetermined position the cam follower 137 is attached on one end of a rock arm 138. The rock arm 138 is pivoted on the arm 43 at 139 and a set screw 140 through the other end of the rock arm bears against the arm 43. The cam follower 137 is held against the cam surface of the cam 88 by a spring 141 (Fig. 8), tensioned between the arm 43, and an arm 142 on the frame 45 of the machine.

To prepare the machine for operation the slide 19 of the cutting head is adjusted angularly relative to the carriage 22 to adjust the angle at which the edge of the top lift 13 is to be trimmed by the cutter 14. The position of the cam follower 137 is adjusted to swing the cutting head 10 toward the heel jack 11 to a point at which the guard 53 just touches the side of the heel stop 131. Thus the slide 19 will always be pushed slightly up into the carriage 22 when the cutter 14 is in contact with the top lift of a heel in the heel jack. The heel stop 131 is adjusted to hold a heel in a position in which the edge of the top lift 13 on the heel 12 is contacted by the edge of the cutter 14 but the top lift is offset slightly to the right so that the cutter 14 will be forced to slide across the top lift a little and bring the guard 53 into positive abutment with the bottom of the top lift to align the cutter 14 with the edge of the top lift. Then the breast gauge 127 and the heel seat support 118 are adjusted for the style heels being trimmed and the shaft 106 is adjusted relative to the sleeve 103 to clamp and unclamp the heels in the jack.

In the operation of the machine the shaft 87 rotates continuously since the clutch mechanism is normally held engaged by the spring 76 and rotates the shafts 72 and 87. If desired, the clutch is disengaged manually by the lever 82. The driving gear 90 and driven gear 91 of the stop motion mechanism (as illustrated in Fig. 8) have a 4 to 1 timing ratio so that a heel in the heel jack 11 is rotated during ⅘ of a cycle of the driving gear 90 and is held stationary for the remaining ⅕ when the driven gear 91 is stopped. The cam 88 which is on the shaft 87 rotates continuously and is arranged to swing the cutting head 10 toward the heel jack 11 to trim a top lift 13 while the heel in the jack is being rotated and then swing back and remain back while the heel jack is stopped.

The cam 89 is arranged to move the shaft 106 to the left to clamp the heel jack 11 just before the heel jack starts to rotate and then moves the shaft to the right to unclamp it when it has completed a revolution.

When a heel has been rotated and trimmed and the heel jack stops and unclamps, the operator removes the heel and inserts another heel to be trimmed.

It will be understood that the above description is of a preferred embodiment and that certain variations may be made in its structure without departing from the spirit of my invention.

I claim as my invention:

1. A machine for trimming surplus stock from around the edge of top lifts on shoe heels comprising in combination a rotating heel jack for supporting a shoe heel and rotating it about an axis substantially perpendicular to a top lift on a shoe heel, a cutter pivotally and slidably mounted to slide relatively toward and away from the edge of a top lift on a heel in the jack and be swingable transversely across the plane of said top lift, resilient means urging the cutter to swing to a predetermined position, means for sliding the cutter into resilient contact with the edge of said top lift, means limiting the transverse swing of the cutter and holding the cutter in alignment with the edge of said top lift when the cutter is in contact therewith, and a rolling gauge movable into contact with said heel and varying the position of the cutter in accordance with the contour of the heel.

2. A machine for trimming surplus stock from around the edge of top lifts on shoe heels comprising in combination a rotating heel jack for supporting a shoe heel and rotating it about an axis substantially perpendicular to a tip lift on a shoe heel, a member movable toward and away from the edge of a top lift on a heel in the jack, a second member slidable in the first member and resiliently urged toward the edge of said top lift of said heel, a cutter pivotally suspended on the second member and contacting the edge of said top lift when the first member is moved to a predetermined position toward said top lift, means for holding the cutter in alignment with the edge of the top lift when the cutter is in contact therewith, and a rolling gauge associated with the cutter and movable into contact with said heel and varying the position of the cutter in accordance with the contour of the heel.

3. A machine for trimming surplus stock from around the edge of top lifts on shoe heels comprising in combination a heel jack for supporting a shoe heel and rotating it about an axis substantially perpendicular to a top lift on the shoe heel, a cutter pivotally and slidably mounted to slide relatively toward and away from the edge of a top lift on a heel in the jack and be swingable transversely across the plane of said top lift, means for sliding the cutter into resilient contact with the edge of the top lift until the pressure of the contact causes the cutter to swing transversely across the edge of the top lift, means contacting a side of the top lift and limiting the transverse swing of the cutter across the edge of the top lift thereby to hold the cutter in alignment with the edge of the top lift when it is in contact therewith, and a rolling gauge associated with the cutter and movable into contact with said heel and varying the position of the cutter in accordance with the contour of the heel.

4. A machine for trimming surplus stock from around the edge of top lifts on shoe heels comprising in combination a rotating heel jack for supporting a heel and rotating it about an axis substantially perpendicular to a top lift on the heel, a cutter mounted for movement toward and away from the edge of a top lift on a heel in the jack, means for moving the cutter into resilient contact with the edge of said top lift, said cutter being pivotably mounted and overbalanced and aligned to swing its cutting edge against the edge of the top lift in a direction transversely through the plane of the edge of the top lift, a guard in fixed relation to the cutter adjacent the end of its cutting edge toward said pivot point and extending beyond its cutting edge, the pressure exerted by the means for moving the cutter into resilient contact with the edge of the top lift being greater than the pressure of the said swing of the cutter thereby to maintain the said extension of the guard in contact with a side of the top lift and hold the cutter in alignment with the edge of the top lift and a rolling gauge associated with the cutter and movable into contact with the heel and varying the position of the cutter in accordance with the contour of the heel.

5. A machine for trimming surplus stock from around the edge of top lifts on shoe heels comprising in combination a rotating heel jack for supporting a heel and rotating it about an axis substantially perpendicular to a top lift on the heel, a member movable toward and away from the edge of a top lift on a heel in the jack, a second member slidable in the first member and resiliently urged toward the edge of said top lift on said heel, a cutter pivotally suspended on the second member and pressed into resilient cutting contact with the edge of said top lift when the first member moves to a predetermined position, said cutter being pivotally suspended transversely of the axis of rotation of said heel and overbalanced and aligned to swing its cutting edge against the edge of the top lift transversely through the plane of the edge of the top lift, the pressure of the second member toward the edge of said top lift being greater than the pressure of the transverse swing of the cutter thereby causing the cutter to swing transversely across the edge of the top lift when the first member moves to said predetermined position, means associated with the cutter and contacting a side of the top lift and limiting the transverse swing of the cutter across the edge of the top lift thereby to hold the cutter in alignment with the edge of the top lift when in contact therewith and a rolling gauge associated with the cutter and movable into contact with said heel and varying the position of the cutting disk in accordance with the contour of the heel.

6. A machine for trimming surplus stock from around the edge of top lifts on shoe heels comprising in combination a rotating heel jack for supporting a heel and rotating it about an axis substantially perpendicular to a top lift on the heel, a member movable toward and away from the edge of a top lift on a heel in the jack, a second member slidable in the first member and resiliently urged toward said heel, a rotating cutter pivotably suspended on the second member and pressed into resilient cutting contact with the edge of a top lift on said heel when the first member moves to a predetermined position, said cutter rotating in substantially the same plane as the top lift and parallel thereto, said cutter being pivotally suspended transversely of its axis of rotation at a point to one side of the plane of the edge of the top lift and overbalanced and aligned to swing its cutting edge against the edge of the top lift in a direction transversely through the plane of the edge of the top lift, a guard in fixed relation to the cutter adjacent the end of its cutting edge toward said pivot point and extending beyond its cutting edge, the pressure of the second member toward the edge of said top lift being greater than the pressure of the transverse swing of the cutter thereby causing the cutter to swing transversely across the edge of the top lift when the first member moves to said predetermined position thereby to maintain said extension of the guard in contact with a side of the top lift and hold the cutter in alignment with the edge of the top lift, and a rolling gauge associated with the cutter and movable into contact with the heel and varying the position of the cutter in accordance with the contour of the heel.

7. A machine for trimming surplus stock from around the edge of top lifts on shoe heels comprising in combination a heel jack for supporting a shoe heel, a cutter, means for moving the cutter into a first contact with the edge of a top lift on a heel in the heel jack, means operating to cause said cutter to move across the edge of said top lift when said cutter is in contact therewith, guard means associated with the cutter and arranged to contact the bottom of said top lift thereby limiting the movement of the cutter across said edge and aligning and holding the cutter in operating position with respect to said edge, and means causing relative progressive movement of the cutter around said edge.

8. A machine according to claim 7 including a gauge associated with said cutter and movable into contact with a heel in said heel jack and varying the position of the cutter in accordance with the contour of said heel.

9. A machine according to claim 8 in which said heel jack is rotatable and movable to clamp and unclamp a heel and support and rotate a heel clamped therein, and including power drive means connected successively to clamp the heel jack on a heel placed therein, move the cutter into contact with a top lift on said heel, rotate the heel jack a predetermined amount and stop, and then move the cutter out of contact with said top lift and unclamp the heel.

References Cited in the file of this patent

UNITED STATES PATENTS

| | | |
|---|---|---|
| 503,475 | Fowler et al. | Aug. 15, 1893 |
| 1,529,049 | Winkley | Mar. 10, 1925 |
| 1,630,563 | Fowler | May 31, 1927 |
| 1,788,545 | Schildknecht | Jan. 13, 1931 |